UNITED STATES PATENT OFFICE 2,174,509

CYCLOHEXANE SULPHONYL CHLORIDES

Arthur L. Fox, Woodstown, N. J., assignor to E. I. du Pont de Nemours & Company, Wilmington, Del., a corporation of Delaware No Drawing. Application June 30, 1938, Serial No. 216,844

13 Claims. (Cl. 260—543)

This invention relates to cyclohexane sulphonyl chlorides, more particularly, new cyclohexane disulphonyl chlorides, and to methods of preparing and isolating the same. In a more limited sense, the invention relates to a process of reacting cyclohexane with a mixture of sulphur dioxide and chlorine and to the recovery of valuable mixtures or components from the reaction product.

This invention has as an object the preparation of cyclohexane sulphonyl chlorides by a single reaction step. A further object is the preparation of cyclohexane sulphonyl chlorides from inexpensive raw materials. A still further object is the preparation of cyclohexane monosulphonyl chloride in an improved manner involving a single reaction step and cheap initial materials. A still further object is the preparation of a crude reaction product containing cyclohexane sulphonyl chlorides. A still further object is the preparation of new and useful cyclohexane disulphonyl chlorides. Still other objects will appear hereinafter.

The above and other objects are accomplished by the following invention which comprises reacting cyclohexane with a gaseous mixture of chlorine and sulphur dioxide in accordance with conditions discussed more fully hereinafter.

In carrying out this process the gaseous mixture of chlorine and sulphur dioxide is passed into liquid cyclohexane at room temperature (about 20–25° C.), usually under illumination with natural and/or artificial light. For best results, the molal ratio of sulphur dioxide to chlorine should be greater than 1:1 and preferably on the order of 2:1. During the progress of the reaction, the gases should be thoroughly distributed throughout the reaction mixture by a suitable device such as a porous diaphragm or a gas distributing stirrer.

Soon after the introduction of the gases begins, the solution takes on the yellow-green color characteristic of chlorine, and the temperature begins to rise. In two to three hours, it will have risen to about 55–75° C., the rate and degree of rise depending on the rate at which the gases are introduced. When the flow of gases is very fast, the reaction mixture should be cooled externally. Most of the vaporized cyclohexane is returned to the reaction vessel by a reflux condenser, and any not so returned can be recovered by passing the exit gases through a trap maintained at about −5° C. Any cyclohexane so collected is customarily returned to the reaction mixture.

When a suitable amount of the gases has been introduced, the reaction is stopped. The total amount of gases used influences the relative amounts of mono- and disulphonyl chlorides formed. Thus, the use of a large excess of the gaseous mixture of chlorine and sulphur dioxide produces relatively larger amounts of cyclohexane disulphonyl chlorides and a correspondingly smaller amount of cyclohexane monosulphonyl chloride. After the reaction has been stopped, dry nitrogen is bubbled through the reaction mixture to remove dissolved chlorine, sulphur dioxide, and hydrogen chloride. This crude reaction mixture can now be used for the preparation of derivatives. However, if desired, separation of the components can be accomplished as described below.

During the course of the reaction, white crystals of cyclohexane-1,4-disulphonyl chloride precipitate in increasing amount. After the degassing with nitrogen, such precipitation is made substantially complete by cooling externally with ice to about 5° C. The solid 1,4-disulphonyl chloride is then separated by filtration, preferably in vacuo, after which it can be further purified, if desired, by washing with cold cyclohexane or other suitable organic solvent in which it is only slightly soluble, or by crystallization from benzene. The melting point of this compound is 187° C. with decomposition. Its structure has been established from the following data:

| Found by analysis | Calcd. for $C_6H_{10}(SO_2Cl)_2$ |
|---|---|
| Percent | Percent |
| C—25.7 | C—25.6 |
| H— 3.9 | H— 3.6 |
| S—22.9 | S—22.8 |
| Cl—25.3 | Cl—25.3 |

Therefore, the formula is $C_6H_{10}(SO_2Cl)_2$. On being heated at 180–190° C., the compound decomposed with the evolution of sulphur dioxide and a small amount of hydrogen chloride. From the decomposition products was isolated a crystalline compound which, after being twice crystallized from methanol, melted at 101–102° C. and contained 46.3% chlorine. This compound is trans-1,4-dichlorocyclohexane since the melting point of the latter is reported as 102° C. (C. 1930, I, 372), and since it theoretically contains 46.4% chlorine. Such evidence indicates the cyclohexane disulphonyl chloride to be a 1,4-disulphonyl chloride of the formula:

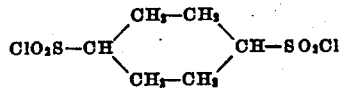

When the liquid product from which the cyclohexane-1,4-disulphonyl chloride has been filtered is subjected to distillation under high vacuum, the first fraction consists of chlorocyclohexane (B. P. 142° C. at 760 mm.), and the second is cyclohexane monosulphonyl chloride, distilling at 85–95° C. at about 0.1 mm. However, during distillation this latter compound decomposes slowly into chlorocyclohexane and sulphur dioxide, and, when an attempt is made to distill in one bath an amount larger than about 100 grams, sulphur dioxide is evolved so rapidly that a sufficiently high vacuum cannot be maintained by an ordinary laboratory oil pump, and extensive decomposition occurs. Therefore, it has been found desirable to carry out the distillation by a "flash" process, in which only a small fraction of the material being distilled is heated at a given time. This greatly reduces thermal decomposition of the product. The crude material is allowed to flow over a surface maintained at about 85° C., from which the cyclohexane monosulphonyl chloride distills to a condensing surface about 3/8 of an inch distant, the pressure of the entire system being maintained at less than 1 mm. The crude material is recycled over the distilling surface until all the cyclohexane monosulphonyl chloride has been removed. Further purification can be accomplished by fractional distillation of the product in small batches, but in general this is not necessary since impurities such as chlorocyclohexanes do not usually interfere with the preparation of derivatives, and the latter are as a rule more susceptible to purification.

The residue remaining after the removal of the chlorocyclohexane, cyclohexane monosulphonyl chloride, and cyclohexane-1,4-disulphonyl chloride from the reaction mixture is a very viscous liquid, from which, on standing, crystals separate. The latter, when filtered off and crystallized from carbon tetrachloride, were found to melt at 96° C. and to have the following elementary analysis:

|  | Found | Calcd. for $C_6H_{10}(SO_2Cl)_2$ |
|---|---|---|
|  | Percent | Percent |
| Carbon | 25.8 | 25.6 |
| Hydrogen | 3.6 | 3.6 |
| Sulphur | 22.7 | 22.8 |
| Chlorine | 25.8 | 25.3 |

Therefore, this product is a cyclohexane disulphonyl chloride different from and isomeric with the cyclohexane-1,4-disulphonyl chloride described above.

The process of this invention is more fully illustrated by the following specific example.

*Example*

Six thousand grams of cyclohexane was placed in a 12 liter flask fitted with a gas distributing stirrer and reflux condenser. Chlorine and sulphur dioxide were mixed and passed into the reaction mixture at 20–25° C. at a rate of four grams of chlorine and five grams of sulphur dioxide per minute (mol ratio, $Cl:SO_2::1:1.4$). Within two hours the temperature had risen to 60° C., after which it continued to increase gradually to a maximum of 72° C. The reaction was continued for 30 hours. At the end of that time 8602 g. (134.4 mols) of sulphur dioxide and 7242 g. (101.9 mols) of chlorine had been used, and the increase in weight of the reaction mixture was 7367 grams. From this reaction mixture were isolated by the general procedure outlined above, 923 g. pure cyclohexane-1,4-disulphonyl chloride, m. p. 187° C., 5273 g. cyclohexane monosulphonyl chloride, and about 600 grams of an isomeric cyclohexane disulphonyl chloride, m. p. 96° C.

While the apparatus described in the example was chosen primarily because it was easily adapted for use in the laboratory, it is obvious that other types may be used, particularly when the process is to be carried out upon a commercial scale. Any of the noncorrosive materials used for chemical apparatus may be employed. Means for distributing the gases may include porous diaphragms, perforated coils or similar devices, which may be used alone or in conjunction with suitable conventional agitators. Instead of a closed vessel provided with a reflux condenser, a long narrow tube may be used. The tube may be partially filled with cyclohexane, chlorine and sulphur dioxide then being bubbled through it upwardly. Such reaction tubes can be filled with various inert materials that provide an extensive surface and thus promote reaction between a liquid and a gas, e. g., Raschig rings, broken glass, glass beads, glass rings, platinum gauze, and chains or rings of any inert material.

Numerous modifications in reaction conditions are possible. The temperature may vary from that sufficient to maintain the chlorine and sulphur dioxide in the gaseous state at the pressure used up to a point just under the decomposition temperature of the products obtained. At atmospheric pressure, a suitable temperature range is from about 20° C. to about 80° C. The best known catalyst is light, which may be ordinary indoor daylight, bright sunlight, or artificial light of various wave lengths—ultraviolet, infrared, or the light of ordinary incandescent lamps. The pressure may vary from atmospheric up to that incidentally developed in closed systems, whenever the latter are used. The reaction may be carried out under conditions such that all reactants are in the vapor phase, and, whether wholly in the vapor phase or not, apparatus and conditions may be so chosen that the reaction may be a batch or continuous one, unreacted ingredients being recovered, purified, and recycled if desired. The reaction may be carried to any desired degree of completion and is usually continued until there has been introduced at least that quantity of chlorine required to give the amount and kind of sulphonyl chloride desired. While it is possible for the proportion of sulphur dioxide to chlorine to be varied at will, the use of sulphur dioxide in molal excess is preferred since chlorination (formation of chlorocyclohexane) is thereby inhibited and a correspondingly higher yield of sulphonyl chlorides obtained. It is desirable to use up to as much as 2–5 mols of sulphur dioxide per mol of chlorine. The amount of chlorine may vary from less than that required for a monosulphonyl chloride (in which case cyclohexane is recovered and reused) up to an amount considerably in excess of that required for a disulphonyl chloride.

The cyclohexane sulphonyl chlorides obtained by the process described herein are useful for preparing a wide variety of derivatives, for which purpose the crude reaction mixture or the purified individual sulphonyl chlorides may be employed. The mixed or pure sulphonyl chlorides may be hydrolized to sulphonic acids by heating with water or aqueous mineral acids, or converted to salts of such sulphonic acids by digestion with appropriately selected bases. The salts can also be obtained, of course, by neutralizing the free sulphonic acid with the base chosen. For the alkaline hydrolysis, 5 to 50% aqueous caustic soda may suitably be used, the reaction being slow with the more dilute, and almost instantaneous with the more concentrated solutions. Other alkali and alkaline earth metal oxides and hydroxides, such as those of caesium, lithium, potassium, barium, and calcium, may also be employed. Similarly, an aqueous solution of ammonium hydroxide may be used to yield the ammonium salt and substituted ammonium salts or amine salts may be obtained by hydrolyzing with aqueous solutions of aliphatic, cycloaliphatic, aromatic and heterocyclic amines, such as dimethylamine, ethylamine, diethylamine, and triethanolamine, piperidine, cyclohexyldiethylamine, pyridine, aniline, toluidine, xylidines, β-naphthylamine, etc. Thus, the amine salts of cyclohexane sulphonic acids may be obtained. Also, the strong quaternary ammonium bases such as tetra-methyl-ammonium-hydroxide and tetra-ethyl-ammonium-hydroxide may be used for the hydrolysis. The resulting products would be the tetramethyl-ammonium salt or the tetra-ethyl-ammonium salt of chlorcyclohexane sulphonic acid. For use in acid or salt solutions one of the amine or quaternary ammonium salts may be more desirable as possessing greater solubility.

Water-miscible organic solvents may be used during the hydrolysis or neutralization step to promote contact between the reaction mass and the hydrolyzing agents. As examples of such solvents or diluents may be mentioned ethanol, propanol, methanol, dioxan, ethylene glycol, ethylene glycol diethyl ether, and ethylene glycol dimethyl ether.

By reaction with alcohols, either alone or in the presence of alkali metals or organic or inorganic bases, the cyclohexane sulphonyl chlorides yield esters which are useful as plasticizers for cellulose derivatives and resins. Examples of such are the ethyl, butyl, and hexadecyl cyclohexane monosulphonates. The butyl ester is obtainable from cyclohexane mono-sulphonyl chloride, butyl alcohol, and sodium, and is a colorless liquid of pleasant odor, boiling at 80–85° C./1 mm. The hexadecyl ester is obtainable from n-hexadecyl alcohol, cyclohexane monosulphonyl chloride, and pyridine, and is a white waxy solid melting at 43–46° C. By reactions of the cyclohexane sulphonyl chlorides with amines, alone or in the presence of aqueous alkalies, amides and substituted amides are obtained, which products are useful as plasticizers, petroleum chemicals, and insecticides, particularly in fly sprays, alone or in combination with pyrethrum. Specific examples of such amides are: cyclohexane sulphonamide, prepared by reacting cyclohexane monosulphonyl chloride with ammonia; N,N-dimethyl cyclohexane sulphonamide, a white crystalline solid of M. P. 58° C. and B. P. 115–120° C./0.3 mm., obtainable by reacting cyclohexane monosulphonyl chloride with aqueous dimethylamine; N-isobutyl cyclohexanesulphonamide, a white, crystalline solid of M. P. 72° C. and B. P. 150–160° C./1 mm., obtained by reacting aqueous isobutylamine with cyclohexane monosulphonyl chloride; N-phenyl cyclohexane sulphonamide, from anilin and cyclohexane monosulphonyl chloride; N-cyclohexyl cyclohexane sulphonamide, M. P. 73° C. and B. P. 165–175° C./1 mm., from cyclohexylamine; N-(2-ethylhexyl) cyclohexane sulphonamide, a colorless viscous liquid of B. P. 180–190° C/1 mm., from (2-ethylhexyl) amine; N-n-dodecyl cyclohexane sulphonamide, a white waxy solid of M. P. 55° C., from n-dodecylamine; cyclohexane-1,4-disulphonamide, a white, crystalline solid of M. P. above 275° C., obtained by reacting cyclohexane-1,4-disulphonyl chloride with ammonia; and N,N'-diphenyl cyclohexane-1,4-disulphonamide, a white crystalline compound of M. P. above 275° C., obtainable from anilin and cyclohexane-1,4-disulphonyl chloride.

The use of cyclohexane as a reactant with chlorine and sulphur dioxide is unique and advantageous since all the cyclohexane hydrogen atoms are equivalent, only one monosulphonyl chloride being possible. In the case of disubstitution products of cyclohexane, only three position isomers are possible. This simplifies the problem of isolating pure cyclohexane disulphonyl chlorides. Thus, a series of definite compounds may be economically obtained, without the attendant very difficult, if not impossible, problem of separating very closely related isomers.

The process of the present invention for preparing cyclohexane monosulphonyl chloride is furthermore a distinct advance over the methods known to the art for preparing this compound. Two methods previously used both entail the use of relatively rare and expensive starting materials, and involve several chemical steps. The present process, by contrast, utilizes easily available starting materials, and involves but one chemical reaction.

Still another advantage of this invention is that it yields two new and useful compounds, cyclohexane-1,4-disulphonyl chloride (M. P. 187°) and a cyclohexane disulphonyl chloride (M. P. 96°) isomeric therewith.

As many apparently widely different embodiments of this invention may be made without departing from the spirit and scope thereof, it is to be understood that I do not limit myself to the specific embodiments of this invention except as defined in the appended claims.

I claim:
1. The process which comprises reacting cyclohexane with admixed chlorine and sulphur dioxide.
2. The process which comprises reacting cyclohexane with admixed chlorine and sulphur dioxide and recovering a cyclohexane sulphonyl chloride.
3. The process which comprises reacting cyclohexane with admixed gaseous sulphur dioxide and chlorine in the presence of ultra-violet light.
4. The process which comprises reacting cyclohexane with a gaseous mixture of chlorine and sulphur dioxide.
5. The process which comprises reacting cyclohexane with a gaseous mixture of chlorine and sulphur dioxide in the presence of light.
6. The process which comprises reacting liquid cyclohexane with a gaseous mixture of chlorine and sulphur dioxide in the presence of light.
7. The process which comprises reacting cyclohexane with admixed sulphur dioxide and chlorine in the presence of ultra-violet light.
8. The process which comprises reacting liquid cyclohexane with a gaseous mixture of chlorine and sulphur dioxide in the presence of light, and thereafter separating the cyclohexane sulphonyl chlorides obtained.
9. The process which comprises reacting liquid cyclohexane with a gaseous mixture of chlorine and sulphur dioxide in the presence of light, recovering a cyclohexane disulphonyl chloride from the crude reaction product, and subsequently recovering cyclohexane monosulphonyl chloride from the residue.

10. The mixture of products obtained by reacting cyclohexane with a gaseous mixture of chlorine and sulphur dioxide.

11. A cyclohexane disulphonyl chloride.

12. A cyclohexane-1,4-disulphonyl chloride.

13. A cyclohexane disulphonyl chloride having the empirical formula $C_6H_{10}(SO_2Cl)_2$ and a melting point of about 96° C.

ARTHUR L. FOX.